US008945753B2

(12) United States Patent
Chen et al.

(10) Patent No.: US 8,945,753 B2
(45) Date of Patent: Feb. 3, 2015

(54) IMPLANTABLE BATTERY HAVING THERMAL SHUTDOWN SEPARATOR

(75) Inventors: Kaimin Chen, New Brighton, MN (US); Craig L. Schmidt, Eagan, MN (US); Paul M. Skarstad, Plymouth, MN (US)

(73) Assignee: Medtronic, Inc., Minneapolis, MN (US)

(*) Notice: Subject to any disclaimer, the term of this patent is extended or adjusted under 35 U.S.C. 154(b) by 2044 days.

(21) Appl. No.: 11/043,301

(22) Filed: Jan. 26, 2005

(65) Prior Publication Data
US 2006/0166078 A1    Jul. 27, 2006

(51) Int. Cl.
*H01M 2/16* (2006.01)
*H01M 2/18* (2006.01)
*H01M 10/42* (2006.01)
*H01M 6/16* (2006.01)
*H01M 10/052* (2010.01)

(52) U.S. Cl.
CPC .......... *H01M 2/1653* (2013.01); *H01M 2/1686* (2013.01); *H01M 2/18* (2013.01); *H01M 10/4235* (2013.01); *H01M 6/16* (2013.01); *H01M 10/052* (2013.01)
USPC ......... 429/129; 428/315.9; 429/144; 429/145

(58) Field of Classification Search
CPC ............ H01M 10/4235; H01M 10/52; H01M 2/1653; H01M 2/1686; H01M 2/18; H01M 2/16; H01M 6/16; H01M 6/14
USPC ................ 429/48, 120, 144–145; 428/315.7, 428/315.9, 316.6, 516; 427/115; 361/303, 361/508; 29/623.1–623.5, 25.03
See application file for complete search history.

(56) References Cited

U.S. PATENT DOCUMENTS

| 4,302,518 A | 11/1981 | Goodenough et al. |
| 4,357,215 A | 11/1982 | Goodenough et al. |
| 4,650,730 A | 3/1987 | Lundquist et al. |
| 4,812,375 A | 3/1989 | Foster |
| 4,964,877 A | 10/1990 | Keister et al. |
| 4,973,532 A | 11/1990 | Taskier et al. |
| 5,144,949 A | 9/1992 | Olson |

(Continued)

FOREIGN PATENT DOCUMENTS

| EP | 682376 A | 11/1995 |
| EP | 924780 A | 6/1999 |

(Continued)

OTHER PUBLICATIONS

Abstract in English of JP 04-163857.*

*Primary Examiner* — Barbara Gilliam
*Assistant Examiner* — Claire L Roe
(74) *Attorney, Agent, or Firm* — Evans M. Mburu

(57) ABSTRACT

The present teachings include an electrochemical cell including an anode, a cathode, an electrolyte, a separator disposed between the cathode and anode, and a housing containing the anode, cathode, electrolyte, and separator. The separator can include a first sheet consisting essentially of a single layer material and a second sheet distinct from the first sheet. The second sheet can include an inner microporous layer laminated between two more outer layers. In some cells, the inner layer can have a transition temperature between a porous configuration and a substantially non-porous configuration that is between about 80 degrees C. and 150 degrees C., and in which the two more outer layers maintain their structural integrity to at least about 10 degrees C. greater than the first layer transition temperature.

20 Claims, 16 Drawing Sheets

(56) References Cited

U.S. PATENT DOCUMENTS

| | | |
|---|---|---|
| 5,147,737 A | 9/1992 | Post |
| 5,158,078 A | 10/1992 | Bennett et al. |
| 5,180,642 A | 1/1993 | Weiss |
| 5,250,373 A | 10/1993 | Muffoletto |
| 5,312,453 A | 5/1994 | Shelton et al. |
| 5,312,458 A | 5/1994 | Muffoletto et al. |
| 5,342,409 A | 8/1994 | Mullett |
| 5,458,997 A | 10/1995 | Crespi et al. |
| 5,468,569 A | 11/1995 | Pyszczek et al. |
| 5,549,717 A | 8/1996 | Takeuchi et al. |
| 5,691,047 A * | 11/1997 | Kurauchi et al. .......... 428/315.7 |
| 5,716,729 A | 2/1998 | Sunderland et al. |
| 5,952,120 A | 9/1999 | Yu et al. |
| 6,432,586 B1 | 8/2002 | Zhang |
| 6,475,666 B1 | 11/2002 | Takeuchi |
| 6,749,961 B1 | 6/2004 | Nguyen et al. |
| 7,035,078 B1 * | 4/2006 | Viavattine ............... 361/303 |
| 2001/0003024 A1 * | 6/2001 | Nemoto ..................... 429/48 |
| 2002/0136945 A1 * | 9/2002 | Call et al. ................ 429/144 |
| 2004/0086782 A1 | 5/2004 | Zhang et al. |
| 2004/0115523 A1 | 6/2004 | Hommura et al. |
| 2006/0092593 A1 * | 5/2006 | Viavattine ............... 361/303 |

FOREIGN PATENT DOCUMENTS

| | | | |
|---|---|---|---|
| EP | 1348540 A | 10/2003 | |
| EP | 1359632 A2 | 11/2003 | |
| JP | 04163857 A * | 6/1992 | ............. H01M 2/16 |

* cited by examiner

IMPLANTABLE BATTERY HAVING THERMAL SHUTDOWN SEPARATOR

FIELD

This disclosure relates to IMDs and more particularly to so-called thermal shutdown separators for use in batteries used to energize a variety of implantable medical devices (IMDs).

BACKGROUND

IMDs are used to treat, monitor and assist in diagnosing patients suffering from a variety of conditions. Examples of IMDs include implantable pacemakers and ICDs, which are electronic medical devices that monitor the electrical activity of the heart and provide electrical stimulation to one or more of the heart chambers, when necessary. For example, a pacemaker may sense an arrhythmia and provide appropriate low-energy electrical stimulation pulses in a controlled manner in order to overdrive and thus, correct the arrhythmia, and restore heart rhythm. The types of arrhythmias that may be detected and corrected by pacemakers include bradycardias, which are unusually slow heart rates, and certain tachycardias, which are unusually fast heart rates. For such tachycardia episodes a pacemaker can employ so-called anti-tachycardia pacing (ATP) in an attempt to restore rhythm by essentially "peeling-back" the underlying rapid rhythm.

As is known, ICDs also detect arrhythmias and provide appropriate electrical stimulation pulses to selected chambers of the heart to correct the abnormal heart rate. In contrast to pacemakers, however, an ICD can also provide pulses that are much stronger and less frequent. This is because ICDs are generally designed to correct fibrillation, which is a rapid, unsynchronized quivering of one or more heart chambers, and severe tachycardias, where the heartbeats are very fast but coordinated. To correct such arrhythmias, an ICD delivers a low, moderate, or high-energy shock to the heart.

Pacemakers and ICDs are preferably designed with shapes that are easily accepted by the patient's body while minimizing patient discomfort. As a result, the corners and edges of the devices are typically designed with generous radii to present a package having smoothly contoured surfaces. It is also desirable to minimize the volume occupied by the devices as well as their mass to further limit patient discomfort.

Energy for IMDs typically includes batteries and capacitors. Batteries and capacitors are volumetrically constrained systems. The size or volume of components that go into a battery (cathode, anode, separator, current collectors, electrolyte, etc.) cannot exceed the available volume of the battery case. The arrangement of the components affects the amount or density of active electrode material contained within the battery case.

Conventional lithium batteries can also employ an electrode configuration sometimes referred to as the "jelly roll" design, in which the anode, cathode, and separator elements are overlaid and coiled up in a spiral wound form. A strip sheet of lithium or lithium alloy comprises the anode, a cathode material supported on a charge collecting metal screen comprises the cathode, and a sheet of non-woven material often separates the anode and cathode elements. These elements are combined and wound to form a spiral. Typically, the battery configuration for such a wound electrode would be cylindrical. An advantage of this design is that there need not be anode material that is not mated to cathode material. Such designs therefore have the potential for an improved match between the cathode and anode components and improved uniformity of anode and cathode utilization during discharge. However, cylindrical cells would not achieve the same space utilization inside the case of an implantable defibrillator as would a prismatic cell shape.

Batteries used in IMDs currently use a chemistry that incorporates a lithium anode to obtain high energy density for the IMDs. For a given volume, higher energy density can translate into a larger amp hour capacity, which can mean a longer useful life for the IMD, or greater functionality. In one example, for a given battery capacity, a higher energy density typically enables a smaller battery configuration, and thus perhaps a smaller overall IMD.

Another prime consideration for batteries in IMDs is safety, as is known if a battery experiences an electrical short a large amount of heat can be generated. In addition, an external electrical short (e.g., an electrical path between IMD components external to the interior of the cell) can cause high current flow and a higher than desirable battery temperature. Of course, an electrical short located within a battery (e.g., between cathode and anode), can cause localized locations of intense heat due to very high current flow. Common commercially available batteries using a lithium or lithium-ion chemistry often have a single porous separator sheet to separate the cathode from the anode, to prevent unwanted direct contact between anode and cathode. In the event of such direct contact, it is possible for the battery overheating to cause the separator to melt. If the porous separator melts in place, to close the pores and form a perfect, impermeable film, then the ion flow between the cathode and anode will be reduced, and the overheating reduced as well. If, however, the porous separator melts in such a way as to further open the pores and to pull back under tension and/or coalesce to form relatively large holes, then temperature self-regulation may not occur. Recently some IMD manufacturers have used two separators between the cathode and anode. This approach provides an improved, somewhat fault-tolerant IMD battery assembly.

In order to better guard against such separator failure caused by overheating, a tri-layer separator has been developed, often having a microporous polyethylene layer laminated between two microporous polypropylene layers. The polyethylene is selected to melt at a lower temperature than the polypropylene, so that the pores in the polyethylene close while being held in place by the adjacent sheets. The tri-layer separators are of high quality. However, there has been concern that a tri-layer separator might be imperfect, might have an undetected hole, and might not totally block ion flow at high temperature. To alleviate any such concerns, some IMD manufacturers used two tri-layer separators between the cathode and anode. This arrangement provides a potentially very safe IMD battery assembly.

Using double tri-layer separators provides safety, but increases battery electrical resistance. The increased resistance is due to ions flow through two separator sheets rather than one. Increased resistance also increases the time required to charge capacitors coupled to the battery.

What would be desirable is an implantable battery that includes a thermal shutdown separator that provides the safety of present thermal shutdown separators, but with less resistance to current flow. It would also be desirable that batteries have safe, but thinner, thermal shutdown separators.

SUMMARY

The present teachings provide electrochemical cells that may be used to power IMDs (IMDs). A non-limiting list of IMDs includes implantable cardioverter defibrillators, implantable cardiac pacemakers, and implantable neurostimulators. Some of the electrochemical cells can include a separator having a first single layer sheet and a second multiple layer sheet. The combination of the first single layer sheet and the second sheet, having perhaps two or more layers, can provide a battery with both an effective separator and lower internal resistance. The separator can provide as effective a separation as current double tri-layer separators, but having a decreased internal resistance. The lower resistance can be used to advantage in charging implantable device capacitors faster than otherwise possible using similar double tri-layer separators. One use of such separators is in implantable defibrillators.

The present teachings include an electrochemical cell including an anode, a cathode, an electrolyte, a separator disposed between the cathode and anode, and a housing containing the anode, cathode, electrolyte, and separator. The separator may include a first sheet consisting essentially of a single layer material and a second sheet distinct from the first sheet. The second sheet may include an inner microporous layer laminated between two more outer layers. In some cells, the inner layer can have a transition temperature between a porous configuration and a substantially non-porous configuration that is between about 80 degrees C. and 150 degrees C., and in which the two more outer layers maintain their structural integrity to at least about 10 degrees C. greater than the first layer transition temperature. In some cells, the first sheet can also maintain its structural integrity to a temperature of at least about 10 degrees C. greater than the second sheet inner layer transition temperature.

Some cells include a second sheet inner layer with an average pore size of between about 0.005 and 5 microns in diameter, with pores occupying at least about 10 volume percent of the inner layer, and the inner layer having a thickness of less than about 1.0 mils (0.0025 cm). In some embodiments, the first sheet, and the second sheet more outer layers are substantially similar, while in other embodiments, they are formed of different materials and/or have different dimensions and/or properties. Some cell embodiments have first and second sheet layers formed of polymeric materials. Some polymeric materials may be selected from the group consisting of polyolefins, polysulfones, polyvinyl chloride, polyvinyl fluoride, polytetrafluoroethylenepolypropylene copolymer, polyamides, polyphenyleneeoxide-polystyrene, polycarbonate, and combinations thereof. In some cells, the first sheet, and second sheet more outer layers, are formed of polypropylene, while the second sheet inner layer is formed of polyethylene.

Another aspect of the present teachings includes an electrode assembly having a first electrode, a second electrode, and a separator located between the first and second electrodes to prevent contact therebetween. The separator can be as previously described with respect to the electrochemical cell.

The present teachings also includes a hermetically sealed IMD (IMD) comprising a hermetically sealed housing, a battery disposed within the housing, and a module selected from the group consisting of therapy delivery modules, monitoring modules, diagnostic modules, and combinations thereof, disposed within the housing and electrically coupled to the battery. The battery may include the electrochemical cells according to the present teachings.

DRAWINGS

DESCRIPTION OF VARIOUS EMBODIMENTS

Figure 1:
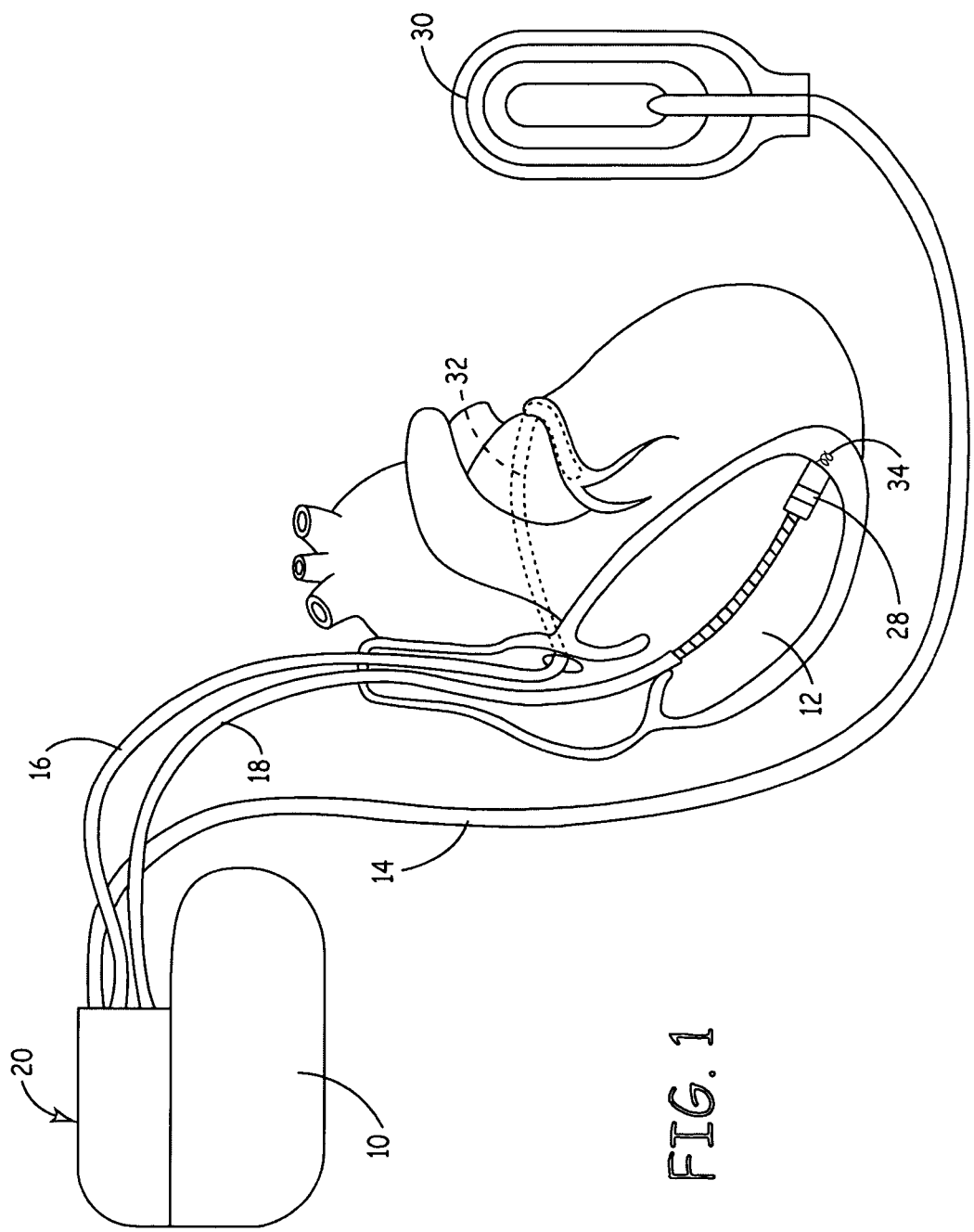
FIG. 1 is a simplified schematic view of one embodiment of an IMD (IMD) incorporating an electrochemical cell.

The following discussion is presented to enable a person skilled in the art to make and use the teachings. Various modifications to the illustrated embodiments will be readily apparent to those skilled in the art, and the generic principles herein may be applied to other embodiments and applications without departing from the spirit and scope of the present teachings as defined by the appended claims. Thus, the present teachings are not intended to be limited to the embodiments, shown, but is to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of the teachings. Skilled artisans will recognize the examples provided herein have many useful alternatives that fall within the scope of the teachings.

Embodiments of the present invention are not limited to ICDs, and may be employed in many various types of IMDs for treating patient medical conditions (e.g., pacemakers, neurostimulators, monitors, and therapeutic substance delivery systems). However, for purposes of illustration only, the teachings are described below in the context of ICDs. It is to be further understood that the present teachings are not limited to high current batteries and may be utilized for low or medium current batteries. For purposes of illustration only, however, the present teachings are below described in the context of high current batteries.

FIG. 1 is a simplified schematic view of an example of an IMD 10, in accordance with an exemplary embodiment of the present teachings. However, IMD 10 may assume a wide variety of forms. Alternatively, or in addition, IMD 10 may be an implantable cardiac pacemaker, such as that disclosed in U.S. Pat. No. 5,158,078 to Bennett et al.; U.S. Pat. No. 5,312,453 to Shelton et al.; or U.S. Pat. No. 5,144,949 to Olson, all hereby incorporated by reference, each in its entirety. Even further, IMD 10 may be an implantable neurostimulator, such as that described, for example, in U.S. Pat. No. 5,342,409 to Mullet; or an implantable drug pump; a cardiomyostimulator; a biosensor; a physiological monitor; and the like.

IMD 10 includes associated electrical leads 14, 16 and 18, although it will be appreciated that IMD 10 may include any number of leads suitable for a particular application. Leads 14,16,18 are coupled to IMD 10 by means of a multi-port connector block 20, which contains operative electromechanical ports for leads 14,16,18. Lead 14 is coupled to a subcutaneous electrode 30, which is intended to be mounted subcutaneously in the region of the left chest. Alternatively, or additionally, an active "can" (i.e., canister) configuration may be employed in which the housing of IMD 10 may serve as an electrode. Lead 16 is a coronary sinus lead employing an electrode located in the coronary sinus and great vein region of heart 12. The location of the electrode is illustrated in broken line format at 32, and extends around heart 12 from a point within the opening of the coronary sinus to a point in the vicinity of the left atrial appendage.

Lead 18 may be provided with elongated electrode coil 28, which may be located in the right ventricle of heart 12. Lead 18 may also include a helical stimulation electrode 34, which takes the form of an advanceable helical coil that is screwed into the myocardial tissue of the right ventricle. Lead 18 may also include one or more additional electrodes for near and far field electrogram sensing.

In the system illustrated, cardiac pacing pulses are delivered between the helical electrode 34 and the elongated electrode coil 28. The electrodes 28 and 34 are also employed to sense electrical signals indicative of ventricular contractions. As illustrated, it is anticipated that the right ventricular electrode 28 will serve as the common electrode during sequential and simultaneous pulse multiple electrode defibrillation regimens. For example, during a simultaneous pulse defibrillation regimen, pulses would simultaneously be delivered between electrode 28 and electrode 30, and between electrode 28 and electrode 32. During sequential pulse defibrillation, it is envisioned that pulses would be delivered sequentially between subcutaneous electrode 30 and electrode 28, and between coronary sinus electrode 32 and right ventricular electrode 28. Single pulse, two electrode defibrillation pulse regimens may also be provided, typically between electrode 28 and coronary sinus electrode 32. Alternatively, single pulses may be delivered between electrodes 28 and 30. The particular interconnection of the electrodes to the IMD 10 will depend somewhat on which specific single electrode pair defibrillation pulse regimen is believed more likely to be employed.

Figure 2:
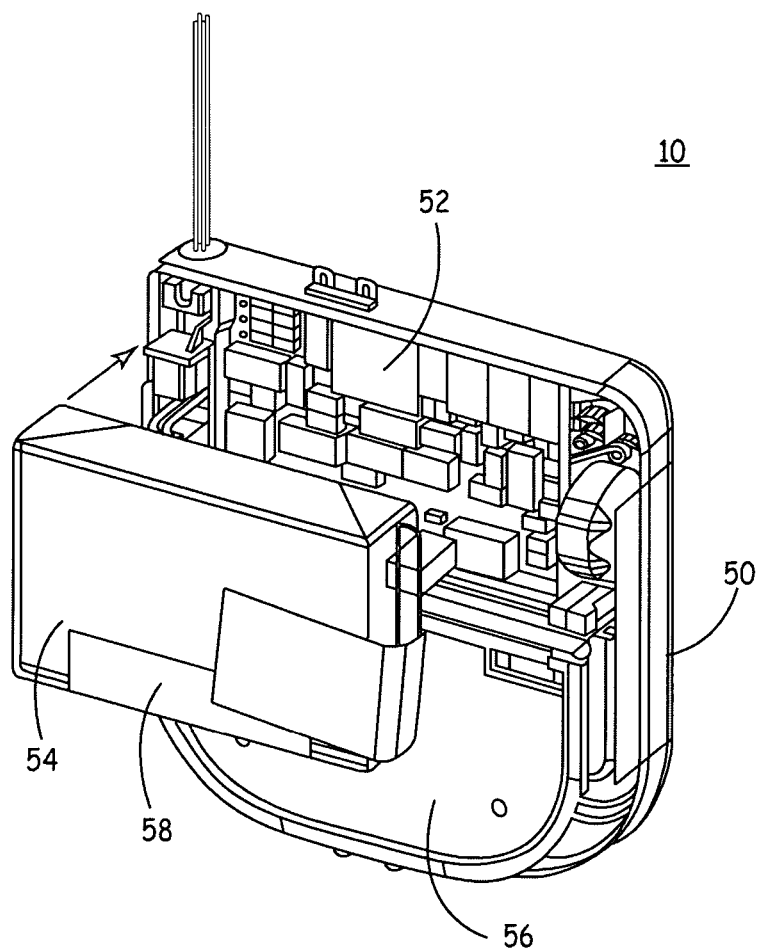
FIG. 2 is an exploded perspective view of various components, including an electrochemical cell, disposed within the housing of one embodiment of an IMD.

As previously described, IMD 10 may assume a wide variety of forms as are known in the art. One example of various components of an IMD 10 is shown in FIG. 2. IMD 10 includes a case 50 (the right-hand side of which is shown in FIG. 2), an electronics module 52, a battery or electrochemical cell 54, and capacitor(s) 56. Each of the components of IMD 10 is preferably configured for the particular end-use application. Thus, the electronics module 52 is configured to perform one or more sensing and/or stimulation processes. Electrochemical cell 54 includes an insulator 58 disposed therearound. Electrochemical cell 54 provides the electrical energy to charge and re-charge the capacitor(s) 56, and to power the electronics module 52.

Figures 3, 4:
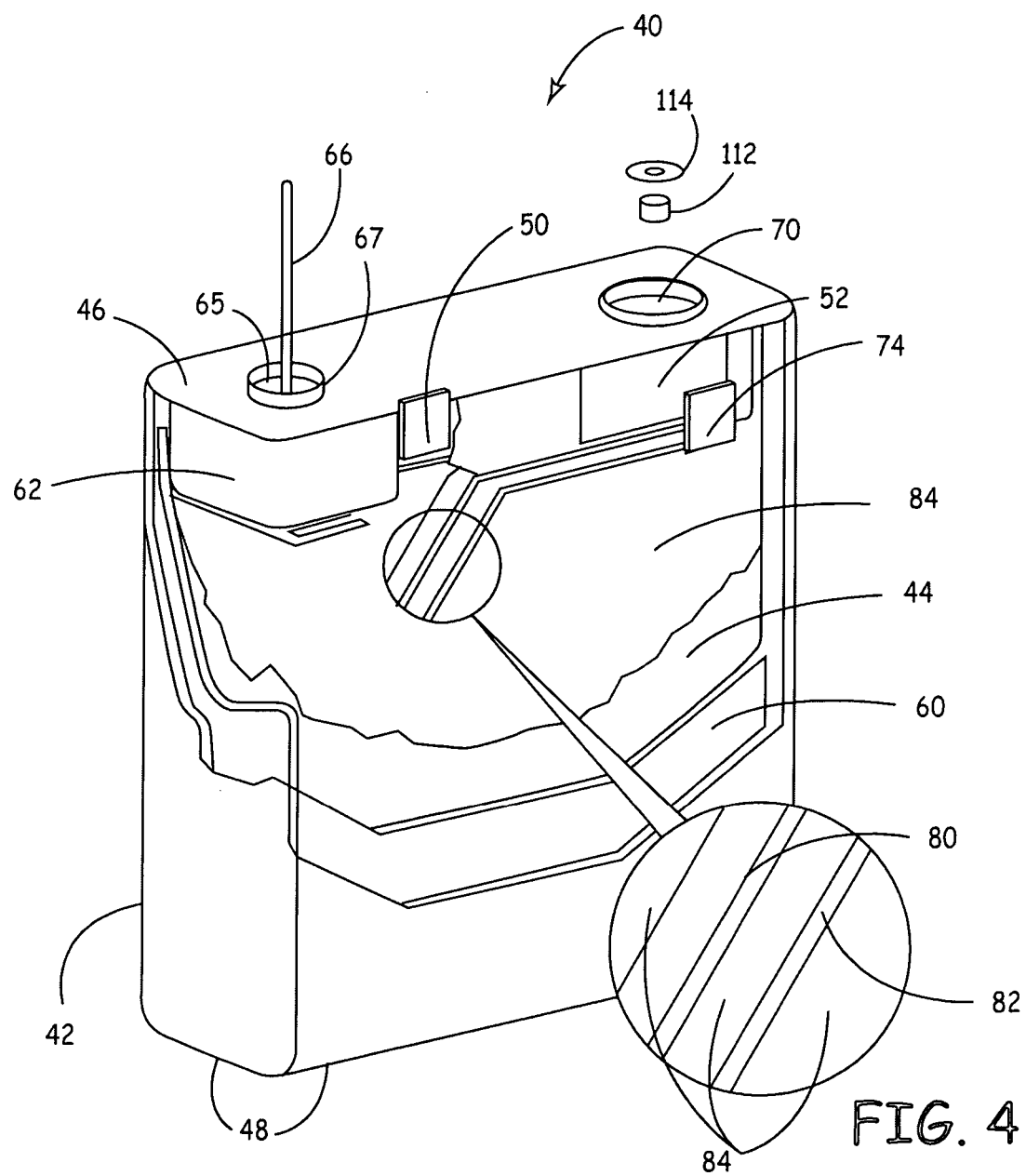
FIG. 3 is a cutaway perspective view of a battery case, electrode assembly, case liner, coil insulator, battery cover, and a headspace insulator in an embodiment according to the present teachings.
FIG. 4 is an enlarged cutaway perspective view of the electrode assembly shown in FIG. 3.

With reference to FIG. 3, an exploded perspective view of a deep drawn battery case in an embodiment according to the present teachings is shown. A battery 40 according to the present teachings includes a deep drawn battery case 42 and an electrode assembly 44. Case 42 is generally made of a medical grade titanium, however, it is contemplated that case 42 could be made of almost any type of metal such as aluminum and stainless steel, as long as the metal is compatible with the battery's chemistry in order to prevent corrosion. Further, it is contemplated case 42 could be manufactured from most any process including but not limited to machining, casting, drawing, or metal injection molding. Case 42 is designed to enclose electrode assembly 44 and be sealed by a battery cover 46. While sides 48 of case 42 are generally planar it is contemplated sides 48 could be generally arcuate in shape. This construction would provide a number of advantages including the ability to accommodate a curved or arcuate electrode assembly 44. Arcuate sides could also nest within an arcuate edge of an IMD such as an ICD.

Figure 6:
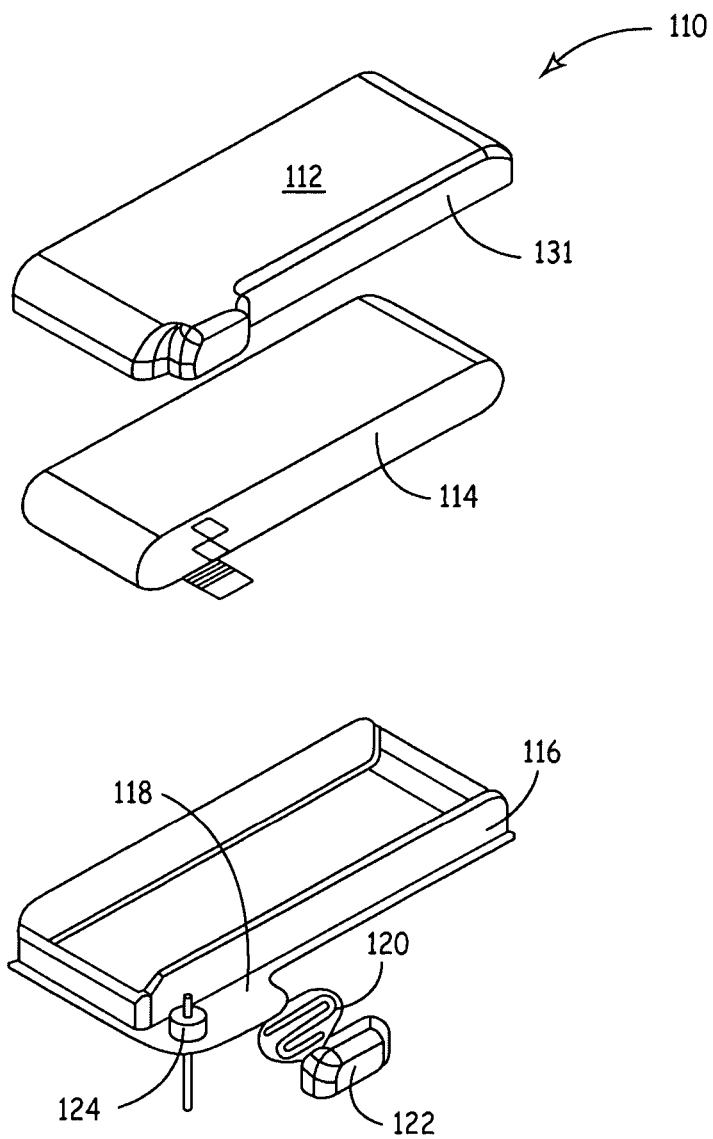
FIG. 6 is an exploded perspective view of a shallow drawn battery according to an embodiment of the present teachings.

In contrast to deep drawn cases, battery case 42 may also be manufactured using a shallow form process. With reference to FIG. 6, an exploded perspective view of a shallow drawn battery according to an embodiment of the present teachings is shown. Battery 110 is comprised of a shallow drawn battery case 112, electrode assembly 114, insulator cup 116, battery cover 118, coupling 120, headspace cover 122, feedthrough assembly 124, and battery case liner 131. The battery case 112 is designed to enclose the electrode assembly 114 and be hermetically sealed with battery cover 118. Embodiments of the teachings may be used in either deep cases or shallow drawn cases without departing from the scope of the teachings.

As used herein, the terms battery or batteries include a single electrochemical cell or multiple cells connected in series or parallel combinations. Batteries are volumetrically constrained systems in which the components in the case of the battery cannot exceed the available volume of the battery case. A discussion of the various considerations in designing the electrodes and the desired volume of electrolyte needed to accompany them in, for example, a lithium/silver vanadium oxide (Li/SVO) battery, is discussed in U.S. Pat. No. 5,458,997 (Crespi et al.). Generally, however, the battery must include the electrodes and additional volume for the electrolyte required to provide a functioning battery.

The present teachings are particularly directed to high current batteries that are capable of charging capacitors with the desired amount of energy, preferably about 20 joules or more, typically about 20 joules to about 40 joules, in the desired amount of time, preferably about 20 seconds or less, more preferably about 10 seconds or less. These values can typically be attained during the useful life of the battery as well as when the battery is new. As a result, the batteries must typically deliver up to about 5 amps at about 1.5 to about 2.5 volts, in contrast to low rate batteries that are typically discharged at much lower currents. Furthermore, the preferred batteries must be able to provide these amounts of energy repeatedly, separated by about 30 seconds or less, more preferably by about 10 seconds or less.

Electrode assemblies 44 and 114 may have spirally-wound, stacked plate, or serpentine electrodes of the type disclosed, for example, in U.S. Pat. Nos. 5,312,458 and 5,250,373 to Muffuletto et al. for "Internal Electrode and Assembly Method for Electrochemical Cells;" U.S. Pat. No. 5,549,717 to Takeuchi et al. for "Method of Making Prismatic Cell;" U.S. Pat. No. 4,964,877 to Kiester et al. for "Non-Aqueous Lithium Battery;" U.S. Pat. No. 5,147,737 to Post et al. for "Electrochemical Cell With Improved Efficiency Serpentine Electrode;" and U.S. Pat. No. 5,468,569 to Pyszczek et al. for "Use of Standard Uniform Electrode Components in Cells of Either High or Low Surface Area Design," the disclosures of which are hereby incorporated by reference herein in their respective entireties. Alternatively, electrochemical cell 54 can include a single cathode electrode as described, for example, in U.S. Pat. No. 5,716,729 to Sunderland et al. for "Electrochemical Cell," which is hereby incorporated by reference in its entirety. The composition of the electrode assemblies can vary. One illustrated electrode assembly includes a core of lithium/silver vanadium oxide (Li/SVO) as discussed in, e.g., U.S. Pat. No. 5,458,997 (Crespi et al.). Other battery chemistries are also anticipated, such as those described in U.S. Pat. No. 5,180,642 (Weiss et al) and U.S. Pat. No. 4,302,518 and U.S. Pat. No. 4,357,215 (Goodenough et al).

With reference to FIG. 4, a cutaway perspective view of the electrode assembly as shown in FIG. 3 is shown. Electrode assembly 44 generally includes a second electrode 80, a first electrode 82, and a porous, electrically non-conductive separator material 84 encapsulating either or both of second electrode 80 and first electrode 82. These three components are generally placed together to form electrode assembly 44. Second electrode 80 of electrode assembly 44 can comprise a number of different materials including second electrode active material located on a second electrode conductor element or current collector.

In an embodiment, the second electrode is an anode in the case of a primary cell or the negative electrode in the case of a rechargeable cell. Examples of suitable electrode active materials include, but are not limited to: alkali metals, materials selected from Group IA of the Periodic Table of Elements, including lithium, sodium, potassium, etc., and their alloys and intermetallic compounds including, e.g., Li—Si, Li—B, and Li—Si—B alloys and intermetallic compounds, insertion or intercalation materials such as carbon, or tin-oxide. Examples of suitable materials for the anode current collector include, but are not limited to: stainless steel, nickel, titanium, or aluminum. Further, the current collector may have a grid configuration, a perforated pattern, or a "solid grid" design. In an embodiment, the anode is comprised of lithium with a titanium current collector. In various embodiments, the anode active material can be pressed into a mesh or etched current collector, or onto the surface of a current collector, or be of pure lithium and have no current collector. In an embodiment, a sheet of lithium is attached to a current collector and then die cut to the desired shape.

First electrode portion 82 of electrode assembly 44 generally includes a first electrode active material located on a first electrode current collector, which also conducts the flow of electrons between the first electrode active materials, and first electrode terminals of electrode assembly 44. In an embodiment, the first electrode is a cathode in the case of a primary cell or the positive electrode in the case of a rechargeable cell. Examples of materials suitable for use as first electrode active material include, but are not limited to: a metal oxide, a mixed metal oxide, a metal, and combinations thereof. Suitable first electrode active materials include silver vanadium oxide (SVO), copper vanadium oxide, copper silver vanadium oxide, manganese dioxide, titanium disulfide, copper oxide, copper sulfide, iron sulfide, iron disulfide, and fluorinated carbon, and mixtures thereof, including lithiated oxides of metals such as manganese, cobalt, and nickel.

Generally, cathode or positive electrode active material comprises a mixed metal oxide formed by chemical addition, reaction or otherwise intimate contact or by thermal spray coating process of various metal sulfides, metal oxides or metal oxide/elemental metal combinations. The materials thereby produced contain metals and oxides of Groups IB, IIB, IIIB, IVB, VB, VIB, VIIB, and VIII of the Periodic Table of Elements, which includes noble metals and/or their oxide compounds.

First cathode and positive electrode materials can be provided in a binder material such as a fluoro-resin powder, generally polyvinylidine fluoride or polytetrafluoroethylene (PTFE) powder also includes another electrically conductive material such as graphite powder, acetylene black powder, and carbon black powder. In some cases, however, no binder or other conductive material is required for the first electrode. In an embodiment, the cathode material can be a powder that is pressed into a mesh current collector. In an embodiment, a cathode paste can be provided which can be laminated, pressed, rolled, or otherwise mounted onto the surface of a current collector. The cathode current collector may be comprised of the same materials and configured similar to that described above for the anode current collector.

It is to be understood that electrochemical systems other than those set forth explicitly above may also be employed in conjunction with the present teachings, including, but not limited to, cathode/anode systems such as: silver oxide/lithium; manganese oxide/lithium; $V_2O_5$/lithium; copper silver vanadium oxide/lithium; copper oxide/lithium; lead oxide/lithium; carbon monofluoride/lithium; chromium oxide/lithium; bismuth-containing oxides/lithium; copper sulfate/lithium; mixtures of various cathode materials listed above such as a mixture of silver vanadium oxide and carbon monofluoride; and lithium ion rechargeable batteries, to name but a few.

Separator material 84 should electrically insulate second electrode 80 from direct contact with first electrode 82. The material is generally wettable by the cell electrolyte, sufficiently porous to allow the electrolyte to flow through separator material 84, and maintains physical and chemical integrity within the cell during operation. Examples of suitable separator materials include, but are not limited to: polyethylenetetrafluoroethylene, ceramics, non-woven glass, glass fiber material, polypropylene, and polyethylene. As illustrated, separator 84 can consist of three layers, for example, having a polyethylene layer sandwiched between two layers of polypropylene. The polyethylene layer has a lower melting point than the polypropylene layers and provides a shut down mechanism in case of cell over heating. The electrolyte solution can be an alkali metal salt in an organic solvent such as a lithium salt (e.g. 1.0M $LiClO_4$ or $LiPF_6$ or $LiAsF_6$) in a 50/50 mixture of propylene carbonate and dimethoxyethane.

Figure 5:
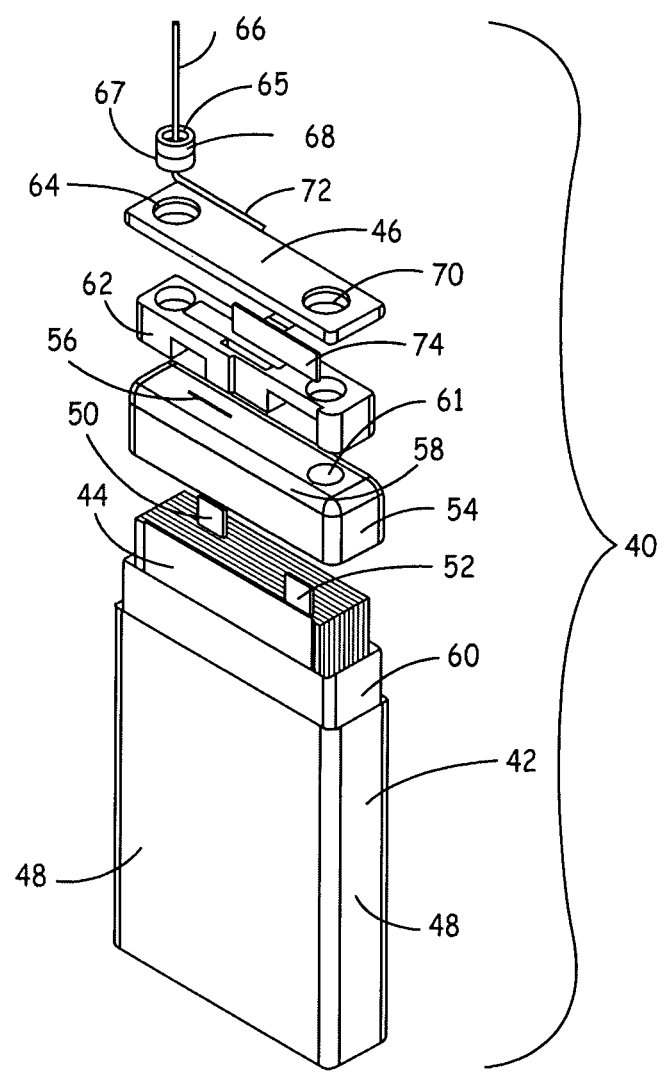
FIG. 5 is an exploded perspective view of a deep drawn battery, including the battery case, electrode assembly, case liner, coil insulator, battery cover, and a headspace insulator in an embodiment according to the present teachings.

As depicted in FIG. 5, an insulator 54 is located on electrode assembly 44 when assembled, which is discussed in more detail below. Insulator 54 includes slits 56 and 58 to accommodate first electrode tab 52 and second electrode tab 50. Insulator 54 further includes aperture 61 allowing electrolyte to enter and surround electrode assembly 44. Generally insulator 54 is comprised of ETFE, however, it is contemplated other materials could be used such as HDPE, polypropylene, polyurethane, fluoropolymers, and the like. Insulator 54 performs several functions including working in conjunction with case liner 60 to isolate case 42 and cover 46 from electrode assembly 44. It also provides mechanical stability for electrode assembly 44.

Electrode assembly 44 can also be generally inserted into an electrically non-conductive case liner 60 during assembly. Case liner 60 generally extends at its top edge above the edge of electrode assembly 44 to overlap with insulator 54. Case liner 60 is often comprised of ETFE, however, other types of materials are contemplated such as polypropylene, silicone rubber, polyurethane, fluoropolymers, and the like. Case liner 60 often has substantially similar dimensions to case 42, but case liner 60 can have slightly smaller dimensions so it can rest inside of battery case 42.

FIGS. 3 and 5 also depict battery cover 46 and a headspace insulator 62 along with case 42 and electrode assembly 44. Similar to case 42, cover 46 is comprised of medical grade titanium to provide a strong and reliable weld creating a hermetic seal with battery case 42. However, it is contemplated cover 46 could be made of any type of material as long as the material was electrochemically compatible. Illustrated battery cover 46 includes a feedthrough aperture 64 through which feedthrough assembly 68 is inserted. Feedthrough assembly contains a ferrule 67, an insulating member 65, and a feedthrough pin 66. Feedthrough pin 66 is comprised of niobium; however, any conductive material could be utilized without departing from the spirit of the teachings. Niobium is generally chosen for its low resistivity, its material compatibility during welding with titanium, and its coefficient of expansion when heated. Niobium and titanium are compatible metals, meaning when they are welded together a strong reliable weld is created.

Feedthrough pin 66 is generally conductively insulated from cover 46 by feedthrough assembly 68 where it passes through cover 46. Insulating member 65 is comprised of CABAL-12 (calcium-boro-aluminate), TA-23 glass or other glasses, which provides electrical isolation of feedthrough pin 66 from cover 46. The pin material is in part selected for its ability to join with insulating member 65, which results in a hermetic seal. CABAL-12 is very corrosion resistant as well as a good insulator. Therefore, CABAL-12 provides for good insulation between pin 66 and cover 46 as well as being resistant to the corrosive effects of the electrolyte. However, other materials besides glass can be utilized, such as ceramic materials, without departing from the spirit of the teachings. Battery cover 46 also includes a fill port 70 used to introduce an appropriate electrolyte solution after which fill port 70 is hermetically sealed by any suitable method.

Headspace insulator 62 is generally located below battery cover 46 and above coil insulator 54, i.e., in the headspace above coiled electrode assembly 44 and below the cover 46. Generally, headspace insulator 62 is comprised of ETFE (Ethylene Tetrafluoroethylene), however, other insulative materials are contemplated such as polypropylene. ETFE is stable at both second electrode 80 and first electrode 82 potentials and has a relatively high melting temperature. Headspace insulator 62 preferably covers distal end 72 of feedthrough pin 66, first electrode tab 52, and second electrode tab 50. While electrode assembly 44 is described as having a first and second electrode tab, it is fully contemplated each electrode could have a plurality of tabs without departing from the spirit of the teachings. Insulator 62 is designed to provide thermal protection to electrode assembly 44 from the weld joining case 42 and cover 46 by providing an air gap between the headspace insulator and the cover in the area of the case to cover weld. Insulator 62 prevents electrical shorts by providing electrical insulation between the first electrode tab 52, second electrode tab 50, and bracket 74 and their conductive surfaces. Illustrated weld bracket 74 serves as conductor between first electrode tab 52 and battery cover 46. Weld bracket 74 is a nickel foil piece that is welded to both cover 46 and first electrode tab 52.

Battery 40 in FIGS. 3 and 5 can be viewed as consisting of three major functional portions. They are the encasement, insulation, and active component portions. The encasement or closure portion consists of case 42, cover 46, feedthrough assembly 68, fillport 70, ball 112, button 114, and electrical connections. The major functions of the encasement are to provide a hermetic seal, a port for adding electrolyte and isolated electrical connections. The major function of the insulators is to prevent electrical shorts. The insulators consist of headspace insulator 62, coil insulator 54, and case liner 60. The active portion of the cell is where the electrochemistry/energy storage occurs. It consists of the electrolyte and electrode assembly 44. Electrode assembly 44 consists of second electrode 80, first electrode 82, and two layers of separator 84.

The resulting battery 40 may be formed as a case negative electrical configuration, i.e. the second electrode 80 (anode) may be electrically connected to the conductive casing 42 serving as the negative polarity external electrical connection for the battery 40, and feedthrough terminal pin 66 may be connected to the first electrode 82 (cathode) serving as the positive external electrical connection for the battery 40. Alternately, the first and second electrode 82, 80 connections can be reversed, resulting in a case positive electrical configuration. Also, a case neutral configuration may be obtained by using a non-conductive casing material and two feedthrough pins 66 for the first and second electrode 82, 80 connections.

As noted above, the first and second electrode 82, 80 portions may each include a current collector portion to which active anode or active cathode material may be applied. In accordance with an embodiment of the teachings, a current collector is described which allows multiple plates of an anode and/or cathode to be electrically connected, eliminating the need for multiple welds and the problems associated therewith (higher internal resistance, weaker structural integrity, etc.), while allowing great flexibility in the design of the shape of an electrochemical cell.

Figure 7:
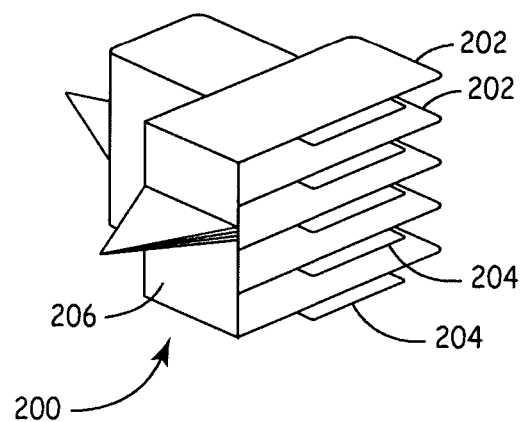
FIG. 7 is a perspective view of an electrode assembly according to an embodiment of the present teachings having a multiple plate anode and cathode interleaved at 90 degrees.

FIGS. 7-12 illustrate various cathode and anode configurations according to the present teachings. Separator sheets are not shown in these figures, but may be understood to be present between the anode and cathode. FIG. 7 illustrates an electrode assembly 200 having a cathode including multiple cathode plates 202 edge connected at 206 and an anode having multiple anode plates 204 and also being edge connected. The anode and cathode plates are oriented at an angle of approximately 90° with respect to each other. As shown, the cathode and anode plate portions are interleaved.

Figure 8:
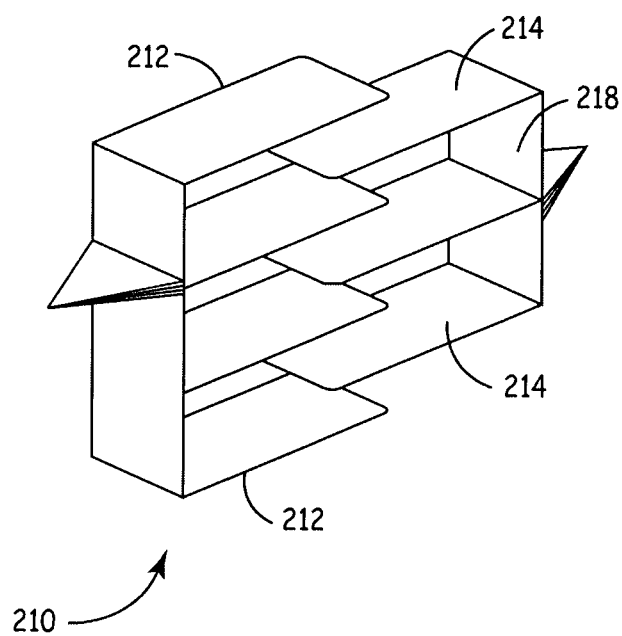
FIG. 8 is a perspective view of an electrode assembly according to an embodiment of the present teachings, having a multiple plate anode and cathode interleaved at 180 degrees.

FIG. 8 shows an electrode assembly 210 in accordance with another embodiment of the teachings having a cathode including multiple cathode plates 212 edge connected at 216 and an anode having multiple anode plates 214 and also being edge connected at 218. The anode and cathode plates are oriented at an angle of approximately 180° with respect to each other. As shown, the cathode and anode plate portions are interleaved. As would be appreciated by one of ordinary skill in the art, the angles at which the anode and cathode current collectors are interleaved may be varied to provide the optimum utilization of available space within the housing of the electrochemical cell.

Figure 9:
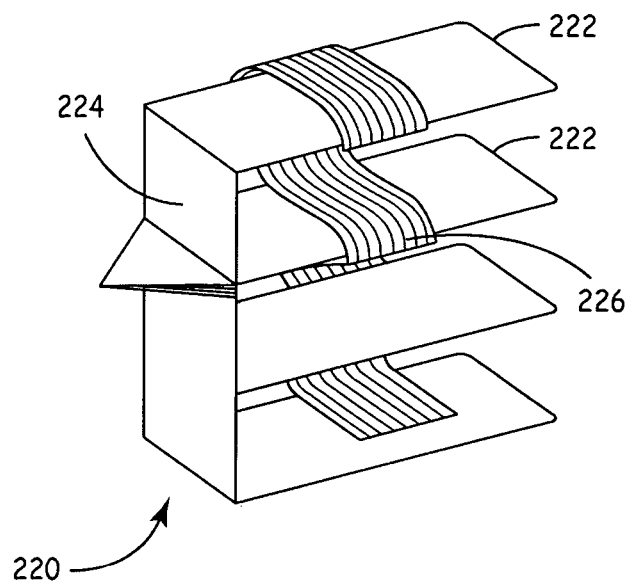
FIG. 9 is a perspective view of an electrode assembly according to an embodiment of the present teachings, having a multiple plate cathode and interleaved serpentine anode plate.

FIG. 9 shows electrode assembly 220 in accordance with an embodiment of the teachings wherein only one of either the cathode or anode utilizes a multi-plate stack. As shown in FIG. 9, the cathode portion of the electrode assembly 220 uses a folded current collector having multiple plates 222 edge connected at 224, while the anode portion 226 is interleaved between the plates of the cathode using a serpentine pattern. In an embodiment, a long continuous anode material surrounded by a separator material weaves continuously between the cathode plates 222. In an alternate embodiment of the teachings, discrete anode plates are placed within a long continuous separator pouch, which is interleaved between the cathode plates 222 in a similar manner. As would be obvious to one of ordinary skill in the art, the anode and cathode portions in FIG. 9 could be reversed without departing from the scope of the teachings.

Figure 10:
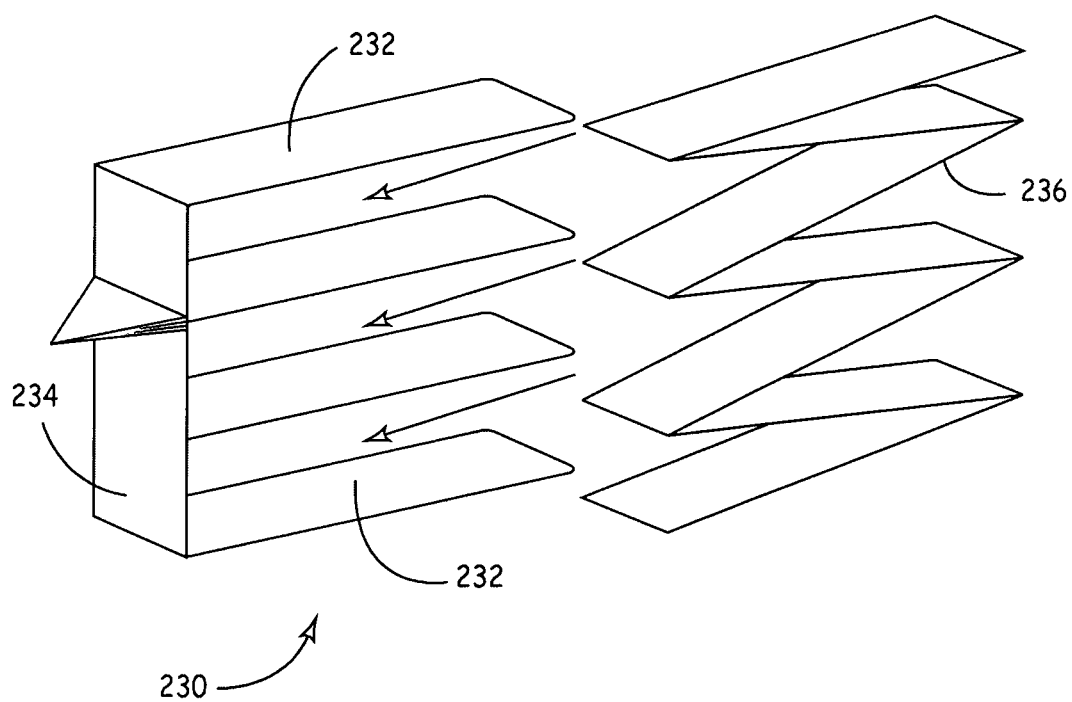
FIG. 10 is a perspective view of an electrode assembly according to an embodiment of the present teachings, having a multiple plate cathode and accordion interleaved anode.

FIG. 10 shows electrode assembly 230 in accordance with an embodiment of the teachings wherein the cathode portion includes a folded current collector having multiple cathode plates 232 edge connected at 234, while the anode portion comprises an accordion pattern 236 wherein alternating folds in the anode portion interleave between the plates 232 of the cathode portion. In an embodiment, a long continuous anode material surrounded by a separator material forms the folded accordion pattern 236 that is interleaved between the plates of the cathode. In an alternate embodiment of the teachings, discrete anode plates are placed within a long continuous separator pouch, which is interleaved between the plates of the cathode in a similar manner. As would be obvious to one of ordinary skill in the art, the anode and cathode portions in FIG. 10 could be reversed without departing from the scope of the teachings.

Figure 11:
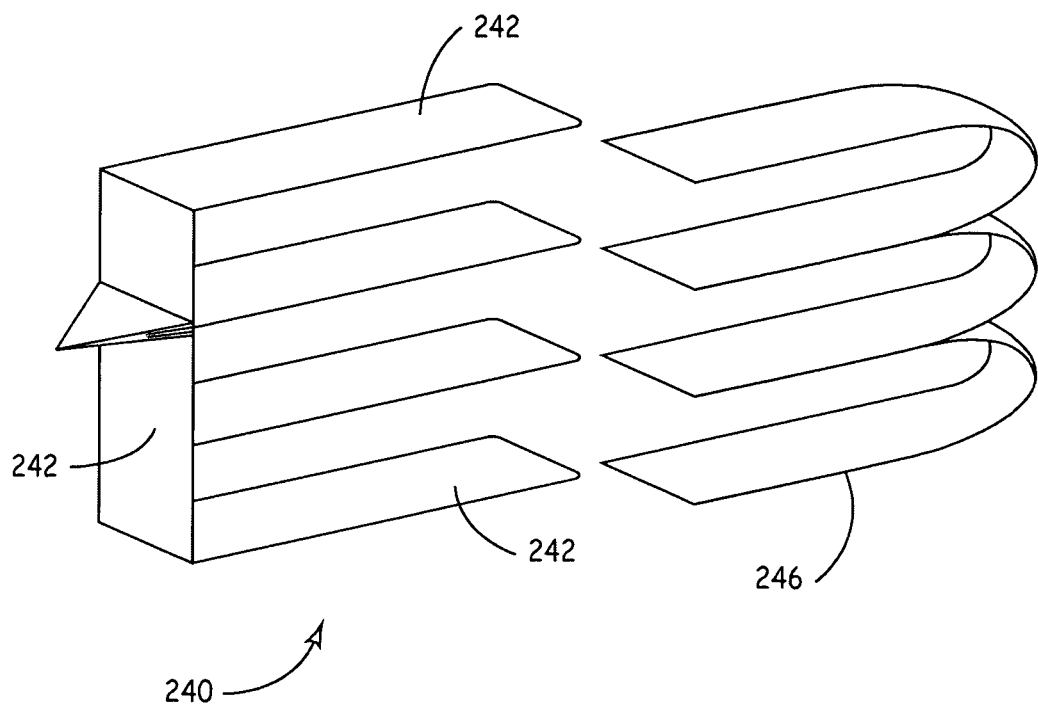
FIG. 11 is a perspective view of an electrode assembly according to an embodiment of the present teachings, having a multiple plate cathode and arched, interleaved anode.

FIG. 11 illustrates another electrode assembly 240 in accordance with an embodiment of the teachings wherein the cathode portion includes a folded current collector having multiple cathode plates 242 edge connected at 244, while the anode portion utilizes an arched, interleaved pattern 246. This design offers potential advantages in terms of heat transfer characteristics, as well as structural integrity due to having fewer sharp folds. In an embodiment, a long continuous anode material surrounded by a separator material forms the arched pattern 246 that is interleaved between the plates 242 of the cathode. In an alternate embodiment of the teachings, discrete anode plates are placed within a long continuous separator pouch, which is interleaved between the cathode plates 242 in a similar manner. As would be obvious to one of ordinary skill in the art, the anode and cathode portions in FIG. 11 could be reversed without departing from the scope of the teachings.

Figure 12:
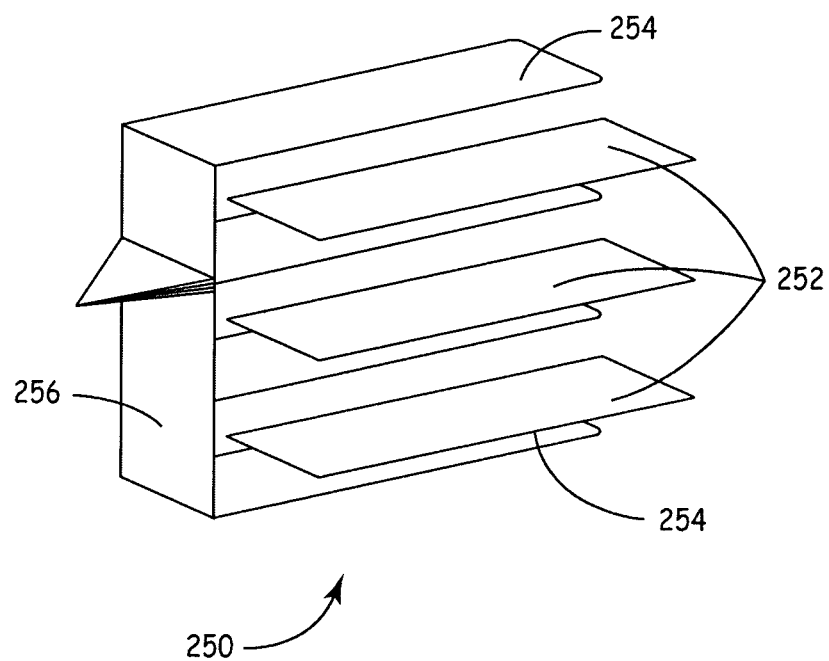
FIG. 12 is a perspective view of an electrode assembly according to an embodiment of the present teachings, having a multiple plate cathode and multiple, discrete plate anode.

FIG. 12 shows still another electrode assembly 250 in accordance with an embodiment of the teachings wherein the cathode portion includes a folded current collector having multiple cathode plates 254 edge connected at 256, while the anode portion is comprised of discrete plates 252 interleaved between the plates 254. As would be obvious to one of ordinary skill in the art, the anode and cathode portions in FIG. 12 could be reversed without departing from the scope of the teachings.

FIGS. 13-19 relate to a separator having two sheets. As used herein, "sheet" refers to an article having a two major surfaces that are much larger than it length and width and may have a thickness of less than about 0.025 cm, or less than about 0.0010 cm, depending on the embodiment. The term "ply" or "layer" refers to a component of a sheet. A sheet includes two or more layers laminated together. The layers may be nonwoven and/or microporous. The microporous layer can have a thickness of less than about 10 mils, 5 mils, or between 0.1 and 4 mils, depending on the embodiment. The pores can be of sufficient size to permit the sheet to exhibit electrical resistivity of 500 ohm-cm or less. The pores can have an average pore size of 40 to about 250 nm in diameter, and may occupy at least 10 percent of the sheet volume, or even at least about 20 or 50 percent of the sheet volume, depending on the embodiment.

The microporous film can transform to an essentially non-porous structure at a temperature of at least about 80 degrees C., or between about 80 degrees C. and 150 degrees C., depending on the embodiment. The microporous fabrics can have a minimal shrinkage at temperatures at least 10 or 20 degrees above the temperature of the transformation of the laminated microporous film in the second sheet.

Figure 13:
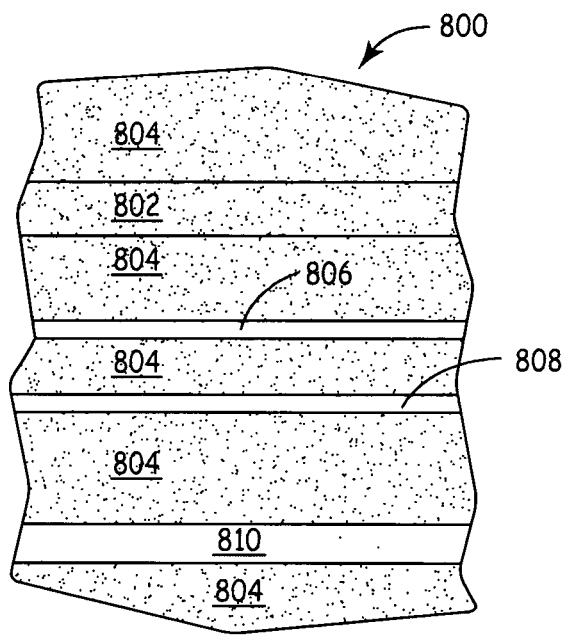
FIG. 13 is a fragmentary view of a cathode-anode pair of an electrochemical cell including a separator having a single layer sheet and a tri-layer sheet.

FIG. 13 illustrates a portion of an electrochemical cell 800. Electrochemical cell 800 represents electrochemical cells or batteries generally, as described elsewhere in the present application. Electrochemical 800 as described elsewhere, can be used to power an implanted medical device, for therapeutic, diagnostic, and/or monitoring purposes. Electrochemical cell 800 can include generally an electrolyte 804. Electrolyte 804 is preferably a non-aqueous electrolyte as a preferred anode material includes lithium, which reacts with water.

Electrochemical cell 800 also includes an anode plate 802. Anode plate 802 can be formed of an active anodic material, as is well known in the art. Active anodic materials preferably include an alkali metal, more preferably lithium. In some embodiments, anode plate 802 is a lithium metal film having a thickness of about 0.005 to 0.04 cm. As used herein, "plate" can include very thin lithium or lithium alloy plates being either planar or curved in shape and may be soft and malleable. A first separator sheet 806 can be a single-layer sheet that exhibits sufficiently low electrical resistivity so as to allow ion flow through the sheet to provide for good battery performance. First sheet 806 can be formed of a polymeric material, for example a polyolefinic material. First sheet 806 can be formed as a non-woven sheet. Examples of some polymeric materials that may be used in the sheets as described in the present application include polyolefins, polysulfones, polyvinylchloride, polyvinylfluoride, polytetrafluoroethylene, polypropylene copolymer, polyamides, polyphenylene-oxide-polystyrene and polycarbonate. In an embodiment, sheet 806 is formed of polypropylene. As described below, sheet 806 preferably maintains its structural integrity at a temperature at least about 10° C. greater than the temperature at which the lower melting point inner layer in the second sheet transform to a non-porous configuration.

Electrochemical cell 800 also includes a second sheet 808. Second sheet 808 can be a tri-layer sheet, formed of three layers or plys laminated together. Sheet 808 is described further with respect to FIG. 14.

Electrochemical cell 800 also includes a cathode plate 810. Cathode plate 810 can be formed of any suitable cathodic active material. The cathode can be formed of materials selected from the group consisting of manganese dioxide, carbon, fluorinated carbon, silver vanadium oxide, copper vanadium oxide, copper silver vanadium oxide, titanium disulfide, copper oxide, copper sulfide, iron sulfide, iron disulfide, and mixtures thereof. Some cathodic materials may be formed of CFx, a fluorinated carbon, where the fluorinated carbon may be fibrous in nature.

In some embodiments, electrolyte 804 includes an alkali metal salt dissolved in the electrolyte solution. Examples of alkali metal salts may be selected from the group consisting of LiPF$_6$, LiAsF$_6$, LiSbF$_6$, LiBF$_4$, LiClO$_4$, LiAlCl$_4$, LiGaCl$_4$, LiC(SO$_2$CF$_3$)$_3$, LiN(SO$_2$CF$_3$)$_3$, LiCF$_3$SO$_3$, LiSO$_3$F and LiB (C$_6$H$_5$)$_4$, and mixtures thereof. The electrolyte may include an organic solvent selected from a group consisting of tetrahydrofuran, propylene carbonate, methylacetate, acetonitrile, dimethylsulfoxide, dimethylformemide, dimethylcarbonate, diethylcarbonate, dimethylacetamide, gamma-butyrolactone, N-methyl-pyrrolidinone, ethylene carbonate, diglyme, triglyme, tetraglyme, 1,2-dimethoxyethane, and mixtures thereof.

Anode plate 802 and cathode plate 810 may be formed in a variety of configurations as described elsewhere in the present application. Anode plate 802 may be edge-connected to numerous other anode plates to form essentially a single anode plate. Similarly, cathode plate 810 may also be edge-connected to form essentially a single cathode plate. In some embodiments, anode plate 802 and/or cathode plate 810 are folded in an accordion, serpentine, or Z-shaped pattern back and forth to effectively form an edge-connected stack having a single cathode and a single anode. The separator material sheets 802 and 804 may likewise be interleaved between the folded anode and cathode plates. Anode plate 802 and cathode plate 810 may also be wound in a familiar jelly roll configuration in some embodiments.

Figure 14:
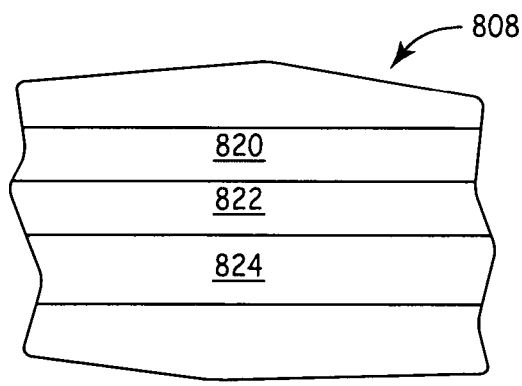
FIG. 14 is a fragmentary detail view of the tri-layer separator of FIG. 13.

FIG. 14 illustrates second sheet 808 in greater detail. Sheet 808 includes an inner layer 822 disposed between two adjacent outer layers 820 and 824. In some embodiments, outer layers 820 and 824 are formed of similar materials to first sheet material 802. The term "sheet" as used herein refers to both a sheet formed from a single material as in first sheet 802 of FIG. 13 and a multi-layer sheet such as second sheet 808 of FIG. 14. Second sheet 808 includes 3 layers or 3 plys that can be laminated together to form essentially a single sheet. Second sheet 808 may also be referred to as a "sheet product", formed of 3 sheets.

Sheet inner layer 822 can be formed of a micro-porous material that may have pores occupying at least about 10% of the inner volume of the layer, depending on the embodiment. Some sheets have an average pore size of from about 40 to about 250 nm in diameter. Second sheet inner layer 822 can have a thickness of less than about 10 mils. (0.025 cm). This inner layer is preferably capable of transforming to a substantially non-porous membrane sheet at a transformation temperature of between about 80° C. and 150° C., while substantially maintaining the predetermined length and breadth dimensions of the sheet. This transformation of the pores from an open to a closed configuration can substantially reduce the ionic flow through the pores, effectively shutting down the battery and preventing any further increase in temperature made possible by the ionic flow. Second sheet inner layer 822 can be formed of a polymeric material, for example, the polymeric materials previously listed for first layer 802. In some embodiments, inner layer 822 is formed of a polyolefinic material, which can be, for example, polyethylene.

Outer layers 820 and 824 can be formed of materials as previously described for first sheet 802, in some embodiments. Outer layers 820 and 824 may be formed of the polymeric materials previously described with respect to first sheet 802. In some embodiments, outer sheets 820 and 824 are formed of micro-porous materials, which may have a larger average pore size and/or a higher volume percent of occupied pores, relative to inner layer 822. In some embodiments, outer layers 820 and 824 are formed of a non-woven material, having a low electrical resistance to ion flow. Outer layers 820 and 824 are preferably laminated to inner layer 822, and in some embodiments, may be effectively co-extruded with the outer layers. The manufacture of tri-layer battery separators is well known to those skilled in the art. See for example, U.S. Pat. No. 5,952,120, herein incorporated by reference. Such tri-layer separators can be formed by having the inner layer sandwiched between two outer layers, bonding the tri-layer precursor, annealing the tri-layer precursor, and stretching the tri-layer precursor. Some tri-layers are formed of a polyethylene film sandwiched between two polypropylene films. Outer layers 820 and 824 are preferably capable of maintaining their structural integrity from ambient temperatures to at least about 10° C. greater than the transformation temperature of inner layer 822. Outer layer 824 is preferably capable of substantially maintaining the original length, breadth, and thickness at temperatures from ambient up to about 10° C. greater than the transformation temperature of inner layer.

According to the present invention the inventors believe that outer layers 820 and 824 provide structural integrity for the lower temperature transforming inner layer 822, allowing the micro-pores of inner layer 822 to effectively close off ion flow, while inner layer 822 is supported by the surrounding outer layers.

Figure 15:
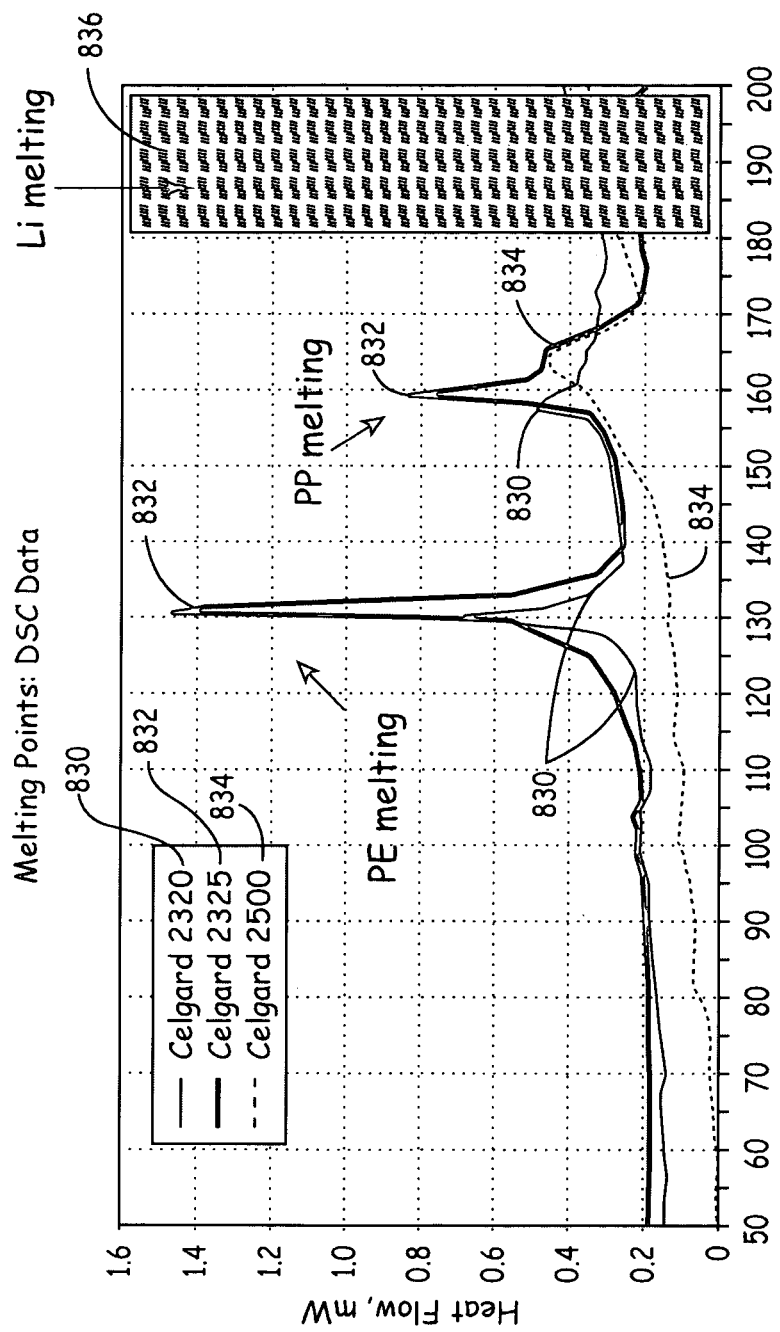
FIG. 15 is a DSC plot for single and tri-layer separators; illustrating different melting points.

FIG. 15 illustrates the differential melting points of selected polyethylene and polypropylene materials. FIG. 15 is a differential scanning colorimetry (DSC) plot of heat flow (mW) versus temperature (degrees C.). A single-layer sheet of polypropylene is shown at 834 (available as Celgard 2500 from Celgard Inc., Charlotte, N.C.). Celgard 2500 may be seen to have a melting peak at around 165° C. as indicted by inspection of data plot 834. The DSC plot for a tri-layer structure having a polyethylene inner layer sandwiched between two polypropylene outer layers is shown at 830. This tri-layer material is available as Celgard 2320. Celgard 2320 is a tri-layer structure having a thickness of about 20 microns. Celgard 2320 may be seen to have a first PE melting peak at about 130° C. and a second polyethylene melting peak at around 158° C. The tri-layer structure thus has a lower melting point of the inner material followed by a higher melting point of the outer, supporting material.

Another tri-layer structure, Celgard 2325 has the DSC data shown at 832. Celgard 2325 is a tri-layer structure having a thickness of about 25 microns. Inspection of FIG. 15 shows that Celgard 2325 has a first, polyethylene melting point at about 132° C. and a second, polypropylene melting point at about 160° C. The "melting points" are also referred to herein as "transformation points". Up until the transformation point, the polypropylene substantially retains its structural integrity. Up until the polyethylene melting or transformation temperature, the polyethylene pores remain substantially open. The lithium melting temperature is indicated at 836 beginning at about 182° C. Thus, the polyethylene and polypropylene are shown to melt at a lower temperature than lithium, effectively shutting of the ion flow and preventing the lithium from reaching such a temperature.

Figure 16:
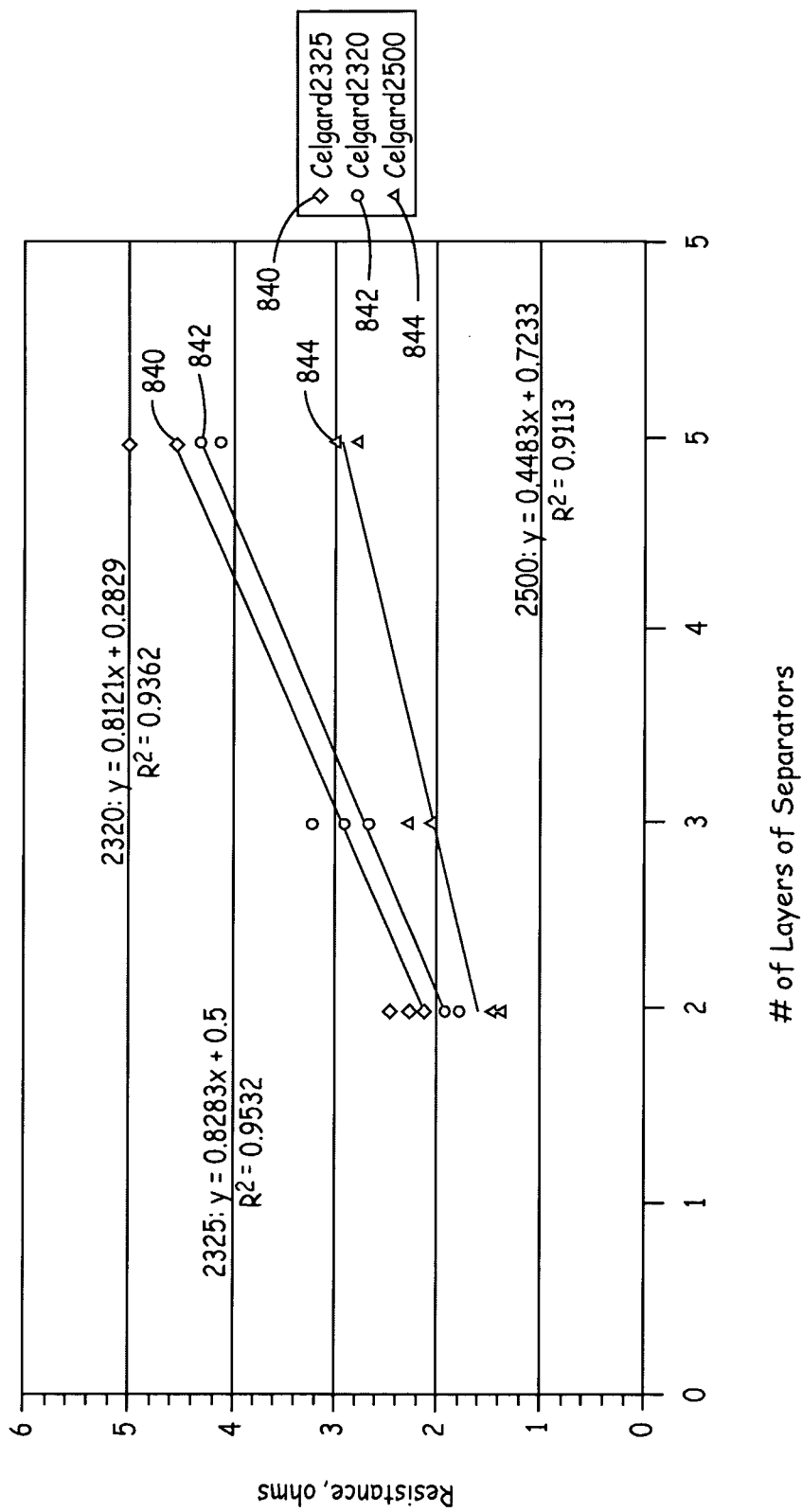
FIG. 16 is a plot of resistance vs. the number of separator sheets.

FIG. 16 illustrates the experimental results of resistance in ohms versus the number of separators shown on the X-axis ranging, from two to five. The results for single-layer, polypropylene (Celgard 2500) are indicted at 844, the results for the 20 micron thick tri-layer (Celgard 2320) are indicated at 842, and the results for the 25 micron thick tri-layer, (Celgard 2325) are indicated at 840. For each of the sheet materials, the resistance may be seen to increase with increasing number of layers. The rate of resistance increase with the number of layers may be seen to increase faster for the tri-layer materials at 840 and 842 than for the single-layer material at 844. This resistance can translate into a higher battery resistance, and thus a longer capacitor charging time in an ICD.

Figure 17:
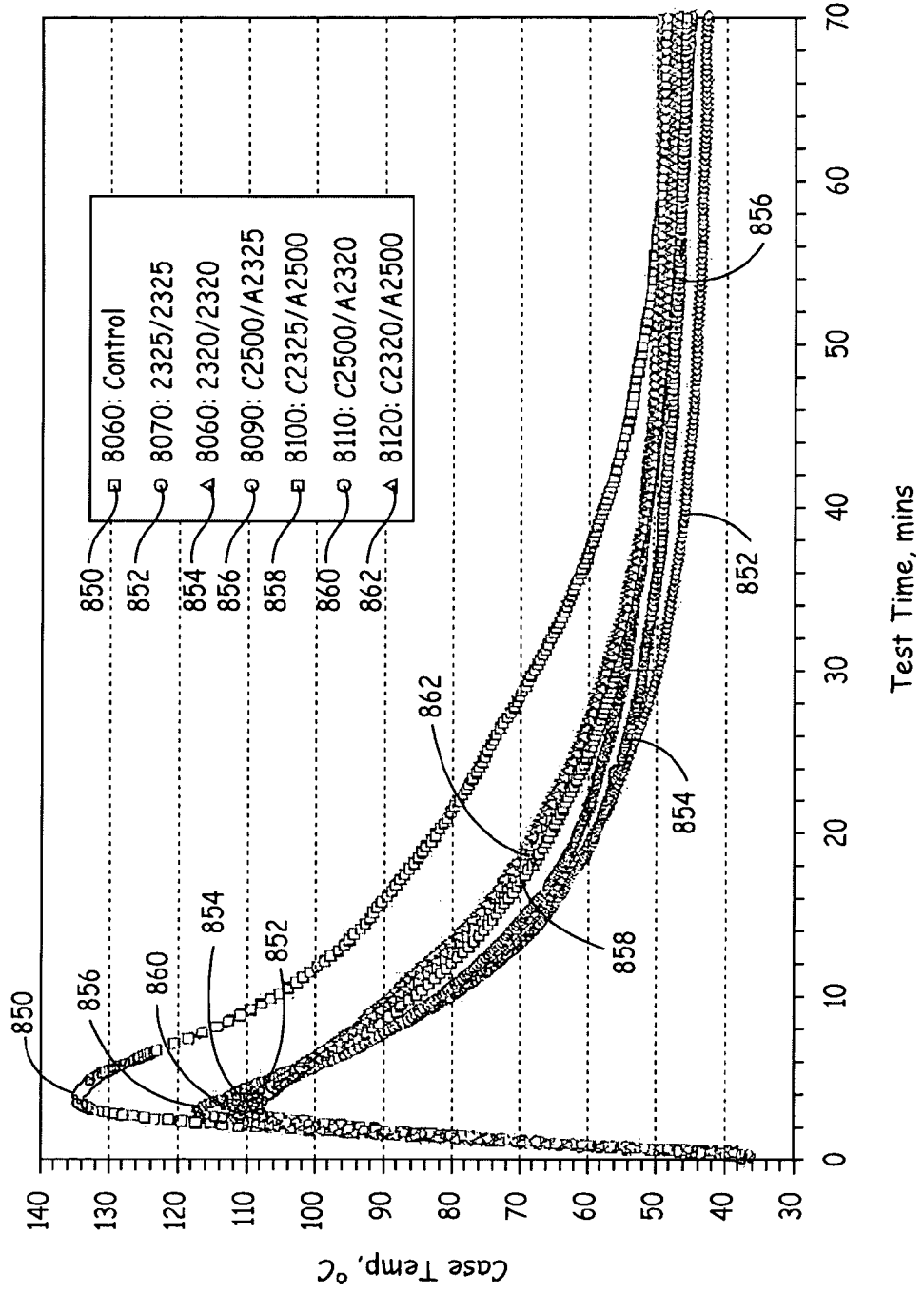
FIG. 17 is a plot of battery case temperature vs. time during an external short, showing the thermal shutdown operation of various separators.

FIG. 17 shows a plot of battery case temperature (during an external short test) versus time. The results for various combinations of separator sheets are shown and will be discussed further. In this experiment, the control is a battery having one sheet of a single-layer of polypropylene (Celgard 2500), on both the cathode and anode, effectively there are two single-layer sheets between the cathode and the anode. The temperature in the control may be seen to rise to about 136° C., a fairly high temperature. The other data points are for Celgard 2325 (25 microns thick trilayer), one sheet each, near the cathode and the anode. A combination of Celgard 2320 (20 microns trilayer) near both the cathode and anode is indicated at 854. Another combination, indicated at 856, has Celgard 2500 (a single-layer, polypropylene sheet) near the cathode and Celgard 2325 (a tri-layer sheet having a thickness of about 25 microns) near the anode. Another separator, indicated at 858, has Celgard 2325 (a tri-layer structure having a thickness of about 25 microns) near the cathode and Celgard 2500 (a single-layer polypropylene sheet) near the anode. Yet another combination is shown at 860, having Celgard 2500 (a single-layer polypropylene sheet) near the cathode and Celgard 2320 (a tri-layer 20 micron thick sheet) near the anode. Finally, at 862, a combination of Celgard 2320 (a 20 micron thick tri-layer sheet) is near the cathode and Celgard 2500 (a single-layer polypropylene sheet) is near the anode.

Thus, separators having two tri-layer sheets are seen at 852 and 854. Four different combinations of tri-layer sheets and single-layer sheets are shown as indicated at 856, 858, 860 and 862. Inspection of FIG. 17 shows that the results are difficult to distinguish from one another, particularly with respect to peak case temperature. Thus, it appears that a tri-layer and single-layer sheet combination are about as effective in limiting case temperature as two tri-layer sheets. However, as seen in FIG. 16, the electrical resistance contribution of the tri-layer sheet is significantly greater than that of the single-layer sheet. Thus, the inventors believe that benefit may be obtained by using a separator including a first, single sheet and a second, tri-layer sheet. This can provide substantially similar temperature control during an external short while providing substantially less resistance. Inspection of FIG. 17 also shows that this combination can limit the case temperature substantially less than the combination of only one single-layer sheet.

Figure 18:
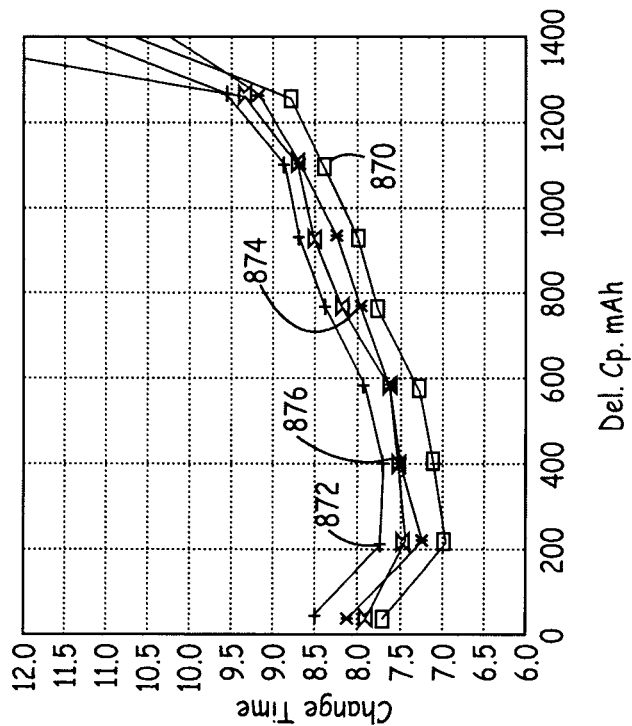
FIG. 18 is a plot of charge time vs. delivered capacity; for cells with two layers of various 1 mil thick separator combinations.
Figure 18:
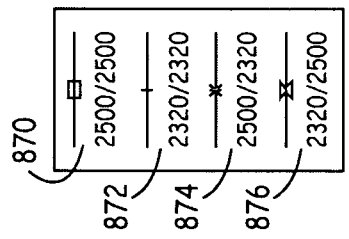

FIG. 18 shows another experimental result, the charging time for four combinations of separator sheets versus delivered capacity in milliamp hours. The results for a pair of Celgard 2500 (single-layer polypropylene) sheets are indicated at 870. A double, tri-layer combination of Celgard 2325 (25 micron thick tri-layer sheets) is indicated at 872. Another combination according to the present teachings, having Celgard 2500 (single-layer, polypropylene) at the cathode and Celgard 2325 (a 25 micron tri-layer sheet) at the anode is shown at 874. The opposite configuration, having Celgard 2325 (a 25 micron tri-layer sheet) at the cathode and Celgard 2500 (a single-layer polypropylene sheet) near the anode is shown at 876.

The control is thus indicated at 870, having a relatively low charge time. As previously shown, this control also allows a larger battery temperature case during external short. The double tri-layer structure results may be seen at 872, providing a relatively longer charge time. The two combinations according to the present teachings, having one single-layer sheet and one tri-layer sheet, are shown at 874 and 876. These may be seen to have charge times intermediate those of the double single-layer sheets and the double tri-layer sheets. Inspection of FIG. 18 shows that the charge times, after an initial drop increase with increasing delivered capacity.

Figure 19:
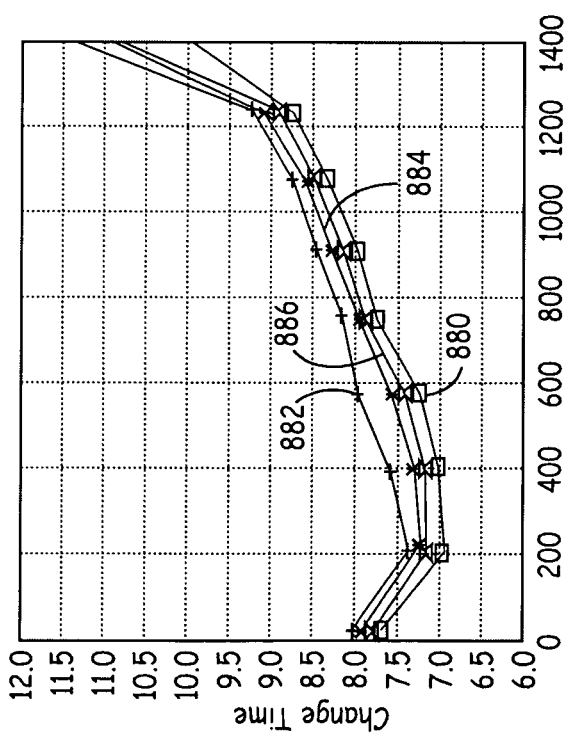
FIG. 19 is a plot of charge time vs. delivered capacity; for various cells with two layers of separator combinations.
Figure 19:
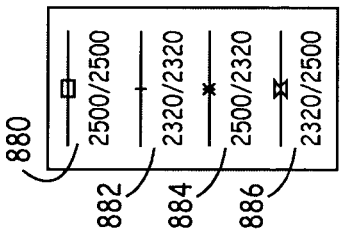

FIG. 19 shows similar results in a similar test of charge time versus delivery capacity where the 20 micron thick tri-layer separators were used rather than the 25 micron thick separators. In particular, two single-layer sheets of polypropylene are indicated at 880. Two tri-layer sheets of Celgard 2320 are indicated at 882. One combination according to the present teachings are shown at 884, having Celgard 2500 (single-layer polypropylene) near the cathode and Celgard 2320 (20 micron thick tri-layer) near the anode. The opposite combination is shown at 886, having Celgard 2320 (20 micron thick tri-layer) near the cathode and Celgard 2500 (single layer polypropylene) near the anode. The control at 880 again showed the shortest charge times while the two sheet tri-layer combination showed the longest charge times at 882. Again, the combinations of the present teachings at 884 and 886 show intermediate charge times.

The present teachings thus provides substantially the same thermal protection using one single-layer sheet and one tri-layer sheet, as was previously provided by two tri-layer sheets. This combination can provide lower resistance and lower charge times for capacitors in implanted medical devices.

Thus, embodiments of the IMPLANTABLE BATTERY HAVING THERMAL SHUTDOWN SEPARATOR are disclosed. One skilled in the art will appreciate that the present teachings can be practiced with embodiments other than those disclosed. The disclosed embodiments are presented for purposes of illustration and not limitation, and the present teachings are limited only by the claims that follow.

We claim:

1. An electrode assembly comprising:
   a first electrode;
   a second electrode;
   an electrolyte; and
   a separator located between the first and second electrodes to prevent contact therebetween;
   the separator comprising:
      a first separator sheet disposed between the first electrode and the second electrode, the first separator sheet comprising two permeable outer layers each adhered to a microporous inner layer; and
      a second separator sheet disposed between the first and second electrodes, the second sheet consisting essentially of a single permeable layer,
   wherein the first separator sheet is separated from the second separator sheet by the electrolyte, and
   wherein the first separator sheet microporous inner layer has a first configuration porous to ion flow and a second configuration less porous to ion flow than the first configuration, and a first transition temperature between about 80 and 150 degrees C. at which the microporous inner layer transforms from the first configuration to the second configuration, and in which the permeable outer layers maintain their structural integrity to a temperature of about 10 degrees C. higher than the first transition temperature.

2. The electrode assembly of claim 1, in which the first electrode comprises a cathode active material, the second electrode comprises an active anode material, and in which the first separator sheet microporous inner and permeable outer layers and the second separator sheet single permeable layer comprises a polymeric material.

3. The electrode assembly of claim 2, in which the first sheet is interposed between the first electrode and the second sheet.

4. The electrode assembly of claim 2, in which the first sheet is interposed between the second electrode and the second sheet.

5. The electrode assembly of claim 2, in which the first and second electrodes are rolled such that the first and second sheets form a spiral shape.

6. The electrode assembly of claim 2, in which the first electrode includes a plurality of electrode plates and the second electrode includes a plurality of electrode plates, in which the first and second separator sheets include a plurality of discrete sheet pairs interposed between the first and second electrodes.

7. An electrochemical cell comprising:
an anode including an active anode material in contact with an anode current collector;
a cathode including an active cathode material in contact with a cathode current collector;
a separator disposed between the anode and the cathode;
an electrolyte; and
a housing containing the anode, cathode, separator, and electrolyte, the separator comprising a first sheet consisting essentially of a single layer material and a second sheet distinct from the first sheet,
wherein the second sheet consists essentially of an inner microporous layer laminated between two outer layers, and
wherein the first sheet is separated from the second sheet by the electrolyte.

8. The electrochemical cell of claim 7, in which the microporous inner layer has a transition temperature between a porous configuration and a substantially non-porous configuration that is between about 80 degrees C. and 150 degrees C., and in which the two additional permeable outer layers maintain their structural integrity to at least about 10 degrees C. greater than the first layer transition temperature of the microporous inner layer.

9. The electrochemical cell of claim 8, in which the first sheet, and the two outer layers of the second sheet are substantially similar in terms of materials, dimensions, and/or properties independently.

10. The electrochemical cell of claim 8, in which the first sheet, and the two outer layers of the second sheet are substantially different from each other in terms of materials, dimensions, and/or properties independently.

11. The electrochemical cell of claim 8, in which the first sheet, and the two outer layers are all formed of polymeric materials.

12. The electrochemical cell of claim 8, in which the first sheet, and the two outer layers of the second sheet comprise polypropylene.

13. The electrochemical cell of claim 8, in which the second sheet microporous inner layer comprises polyethylene.

14. A battery comprising:
a plurality of anode layers;
a plurality of separator layers;
a plurality of cathode layers;
an electrolyte;
wherein the cathode and anode layers are configured as a stack having one of the plurality of separator layers disposed therebetween,
wherein the one of the plurality of separator layers includes a first sheet and a second sheet, the first sheet consisting essentially of a unitary polymeric material having an electrical resistivity of less than about 500 ohms per square centimeter, wherein the first sheet is separated from the second sheet by the electrolyte.

15. The battery of claim 14, in which the second sheet microporous inner layer comprises a polymeric material.

16. The battery of claim 15, in which the second sheet microporous inner layer polymeric material comprises polyethylene.

17. The battery of claim 14, in which the second separator sheet two additional permeable outer layers comprise polypropylene.

18. The battery of claim 14, in which the first separator sheet comprises a polymeric material.

19. The battery of claim 14, in which the first separator sheet comprises polypropylene.

20. The battery of claim 14, wherein the first separator sheet microporous inner layer has a first configuration porous to ion flow and a second configuration less porous to ion flow than the first configuration, and a first transition temperature between about 80 and 150 degrees C. at which the microporous inner layer transforms from the first configuration to the second configuration, and in which the permeable outer layers maintain their structural integrity to a temperature of about 10 degrees C. higher than the first transition temperature.

* * * * *